Sept. 15, 1970   E. W. WALTER   3,528,153
RASP BLADE CONSTRUCTION

Filed Aug. 13, 1969

INVENTOR.
ERNEST W. WALTER
BY Bosworth, Sessions
Henstrom + Cain
ATTORNEYS.

INVENTOR.
ERNEST W. WALTER
ATTORNEYS.

United States Patent Office 3,528,153
Patented Sept. 15, 1970

3,528,153
RASP BLADE CONSTRUCTION
Ernest W. Walter, P.O. Box 2119, 2411 Cypress Gardens Road, Winter Haven, Fla. 33880
Filed Aug. 13, 1969, Ser. No. 849,782
Int. Cl. B23d 71/00; B27f 1/00
U.S. Cl. 29—79
22 Claims

ABSTRACT OF THE DISCLOSURE

An improved rasp blade is provided for removing rubber from a carcass of a tire prior to retreading, recapping, or the like. Different shapes of cutting teeth are described adapted for various cutting actions, but all teeth have in common elevating portions which raise the teeth with respect to a support. The elevating portions are spaced apart to define exits therebetween, so that cuttings and the like formed by the teeth readily clear the blade.

In a preferred form, the rasp blade has a warp-resistant, integral U-shaped cross-section in which each leg of the U-shape has a blade structure as described. The dual blade unit may be detachably mounted with respect to a rasp head or the like.

CROSS REFERENCE TO RELATED APPLICATION

A preferred manner of mounting the present rasp blades in a rasp head, as well as other related improvements for a rasp head, are described in a copending application entitled, "Rasp Head Construction," filed on Aug. 13, 1969, in the name of Ernest W. Walter and assigned Ser. No. 849,783.

BACKGROUND OF THE INVENTION

The present invention relates to a rasp blade particularly useful in buffing or abrading a rubber tire in order to prepare the carcass of the tire for recapping, retreading, or the like.

The useful life of a rubber tire can be lengthened by applying as by vulcanization a new rubber wear surface over the carcass after the original tread has become worn. Prior to such recapping or retreading as it is termed, it is necessary to remove the worn residual rubber essentially down to the fiber body of the tire in order to prepare a fresh, uniformly contoured surface to which the recap or retread will suitably adhere. This is accomplished by thrusting the peripheral surface of the tire against a revolving rasp head having cutting teeth which loosen, tear, and grind away the excess worn rubber on the tire and also roughen the resulting surface so as securely to bind the after-applied rubber in a recapping operation.

During the buffing or abrading operation, substantial frictional heat is generated. The surface temperature of a tire, for example, may rise to about 180° F. or higher. Such elevated temperatures adversely affect both the tire and the rasp blade. The excessive heat can soften the rubber of the tire and produces glazing. Rather than preparing the tire for suitable recapping or retreading, an abrading operation that produces glazing inhibits an acceptable adherence of the abraded carcass to the recapping rubber.

The rasp blade itself is also seriously affected by excessive heat. Normally, such blades are heat-treated prior to use, and heat from buffing tempers the blade so that its hardness is diminished. The teeth of the blade become more susceptible to breakage and wear much more quickly, become dull, and cause the tire to smoke. Since rasp blades are usually thrown away after a wear of only about 0.025 inch from the tip of their teeth, accelerated wear due to heat becomes an expensive item. Still further, heat treating tends to warp the rasp blades. Not only does this affect the order of the cutting teeth, but as a result it is also difficult to mount a requisite number of blades side-by-side as in a rasp head.

It would therefore advance the art if a rasp blade were available which inherently operates at a relatively low temperature so as to avoid glazing of the tire and to provide a longer, useful life substantially free of warpage.

SUMMARY OF THE INVENTION

It might be expected that placing more cutting teeth on a rasp blade would lead to a more efficient abrading operation. Development work has shown that this is not the case. When cutting teeth are crowded relatively close together, some teeth do not even have an opportunity to function, and bits of cut rubber and the like become trapped between blades of the teeth. Indeed, it has been determined that one contributing factor to excessive heat attendant buffing a tire is that rubber chips and other cuttings become trapped and the accumulation leads to a build-up of heat. On the other hand, if teeth of a rasp are spaced relatively far apart to avoid entrapment of cut rubber and the like, the spaced teeth cause grooving, gouging, and undue roughness in the tire surface. These conditions frequently cause gas or air pockets to form between the tire carcass and the subsequently applied rubber tread stock.

In accordance with the present invention, the cutting teeth of the rasp blade are spaced sufficiently close to avoid grooving, gouging, and the like, and the blade is further designed with exits or channels which guide the cuttings clear of the blade. The teeth may have one of several improved designs. Preferably, the rasp blade is made as an integral, U-shaped, double-bladed unit. The connecting bridge or bight section of the U-shape makes the unit considerably more resistant to warpage than a single blade having a simple one-plane configuration.

In a preferred form, the double-bladed unit is slidably carried on a mounting member from which the unit can be easily and readily removed. The mounting member may be secured with other like units in a rasp head.

BRIEF DESCRIPTION OF THE DRAWINGS

The accompanying drawings illustrate a presently preferred embodiment wherein.

DESCRIPTION OF THE PREFERRED EMBODIMENTS

In general, the present invention contemplates an improved rasp blade construction which may have one of several forms of cutting teeth; a dual-blade unit in which each of the blades may have the present blade construction; and the dual-blade unit in combination with a mounting strip or bar.

Figure 1:
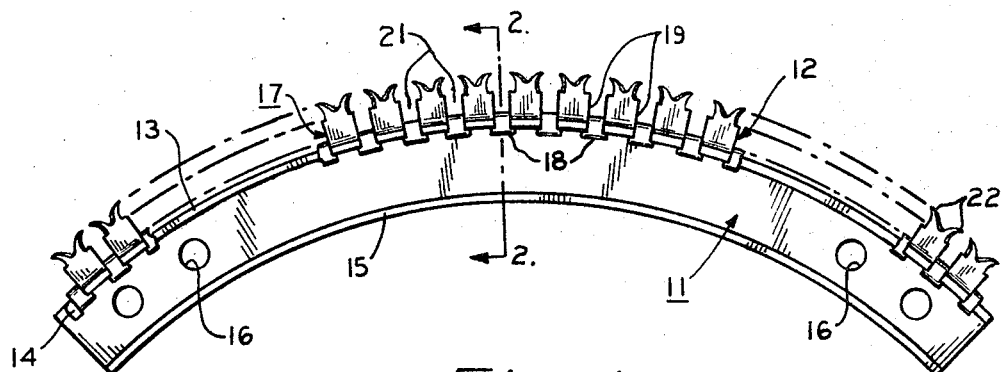
FIG. 1 is a side elevation of a mounting bar carrying a rasp blade of the present invention.
Figure 2:
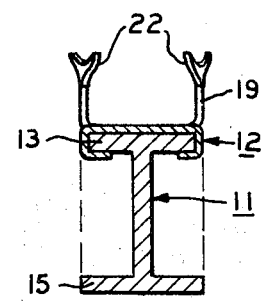
FIG. 2 is a section of FIG. 1 on the line 2—2.

Referring initially to FIGS. 1 through 5, the embodiment illustrated comprises a bar or arm 11 of I-shape in cross-section on which as rasp blade generally indicated at 12 is slidably mounted. The bar 11 is arcuately shaped in the direction of its length to form a segment of an annulus. Both sides of an upper flange 13 are turned downwardly adjacent one end of the bar 11 to form tabs 14 which limit the movement of the rasp blade 12 in that direction. A lower flange 15 of the bar has a width substantially equaling the width of the upper flange 13 plus side-overlapping portions of the blade 12 as illustrated best in FIG. 2 by the vertical dotted lines. This enables a series of the dual-bladed units as shown in FIGS. 1 and 2 to be placed side-by-side on a rasp head without interference. For this purpose, the central portion of the bar 11 has spaced openings 16 for mounting the bar on a rasp head, as by means of pins extending through the openings.

Referring now more particularly to the structure of the rasp blade 12, the illustrated embodiment is also curved in the direction of its length in matching curvature and length with that of the bar or arm 11. The blade 12 is U-shaped in cross-section (FIG. 2), each side or leg having substantially equispaced, upstanding projections, generally indicated at 17, and intervening tabs 18 arranged in alternate fashion. The tabs 18 point downwardly and around the upper flange 13 of the bar for a sliding engagement therewith.

Each projection 17 includes an elevating section 19 which raises the teeth it carries away from the body or back of the blade 12 and permits a deeper penetration of the teeth into a tire. Further, since each elevating section is spaced from companion sections, the intervening open areas, represented at 21 in the drawings, define exits or channels through which chips and chunks or rubber and other cuttings may readily pass to clear the blade 12 and prevent a build-up of heat due to accumulated cuttings.

Figures 3, 4:
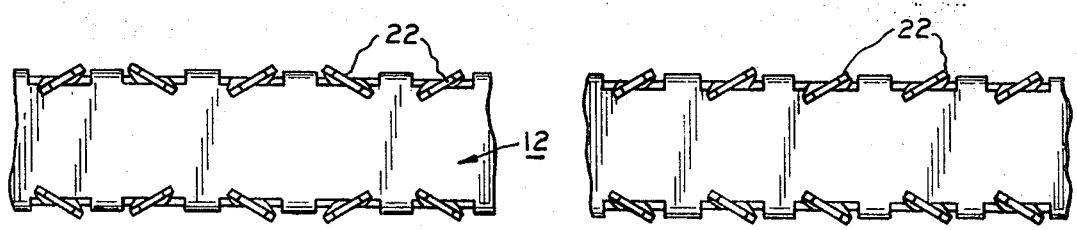
FIG. 3 is an enlarged, fragmentary, plan view of the rasp blade of FIG. 1 and shows one angular arrangement of the cutting teeth.
FIG. 4 is an enlarged, fragmentary, plan view similar to FIG. 3 and illustrates still another of the several possible angular arrangements the cutting teeth may assume.

The present invention also contemplates several designs for cutting teeth which may be used on a single, planar blade or in the double-bladed construction of FIGS. 1 and 2. While a certain angular relation of a particular tooth design may be preferred for a given purpose, such as the degree of buffing sought, it is expressly understood that in all teeth designs disclosed, the teeth may be parallel to each other in any direction, converge, diverge, assume a staggered relation to each other, or any combination thereon. For example, FIGS. 3 and 4 illustrate two of several possible arrangements. In FIG. 3, teeth 22 of the blade 12 are staggered along each side of the blade, the corresponding teeth of the two sides alternately converging and diverging. In FIG. 4, the teeth 22 of the two sides are uniformly angled in a converging arrangement, as viewed from the left, for a less coarse buff than provided by the disposition of the teeth of FIG. 3. As a rule, cutting teeth may be angled from about 5° to about 15° from a longitudinal axis of the rasp blade.

Figure 5:
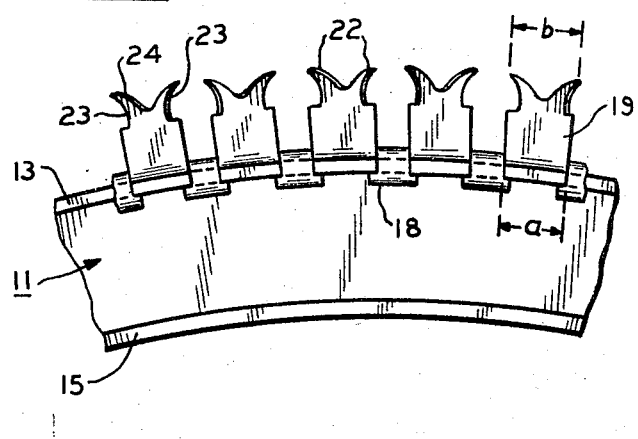
FIG. 5 is an enlarged, fragmentary view of FIG. 1 and shows a form of cutting teeth designed for a relatively fine abrading action.

The tooth design indicated at 22 in FIGS. 1 through 5 has been found especially useful in providing a relatively fine buff on a tire or for use on small tires. The cutting members extending above each elevating section 19 comprise a pair of diverging, pointed teeth 22 preferably having a true circular curvature on their remote edges 23 and being separated by a depression or valley 24 of substantially parabolic curvature (FIG. 5). By the term "true circular curvature" is meant a concavature described by an arc of a circle as distinct from an arc of an ellipse.

In order to strengthen the teeth of a rasp blade against breakage and chipping and to support a desired penetration of the teeth into rubber, it is desirable that the longitudinal length of an elevating section 19 be at least equal to the longitudinal distance extending between opposed edges of the teeth the section carries. This construction is preferred for all the teeth of whatever design, but it is especially illustrated in FIG. 5 in connection with teeth 22 where each section 19 has a longitudinal length $a$ at least equal to the longitudinal length $b$ of a pair of the teeth 22.

In fabricating a dual-blade unit, such as that illustrated in FIGS. 1 through 5, the bar 11 may be of cast aluminum, which has the advantage of being lightweight and reducing the cost. However, heavier metals such as cold roll steel can be used if desired. The rasp blade 12 is so designed that it can be entirely punched from sheet metal, measuring for instance from about 0.025 to about 0.030 inch in thickness for the blade of FIGS. 1 through 5, and from about 0.030 to about 0.050 inch in thickness for the blades of FIGS. 6 through 10, hereinafter described. The elevating sections 19 and teeth are then bent upwardly to define the U-shaped cross-section, while the tabs 18 are bent downwardly to form attaching means. In one embodiment, the bar 11 and rasp blade 12 were arcuately shaped to a radius of 4.5 inches. Preferably the blades are heat treated before use.

In use, the tabs 18 slidably embrace the upper flange 13 for mounting blade 12 on the bar 11. Preferably, end tabs 14 are at the leading end of the bar when it is mounted on a rotatable rasp head, so that centrifugal force keeps the blade 12 against the tabs 14 and in place over the bar 11. Yet, the bar can be easily detached from a rasp head and the blade unit 12 removed from the bar when desired.

FIGS. 6 through 9 illustrate other double-blade units which are similar to that of FIGS. 1 through 5 except for the design of the teeth. Accordingly, like parts have been designated by like reference numerals.

Figure 6:
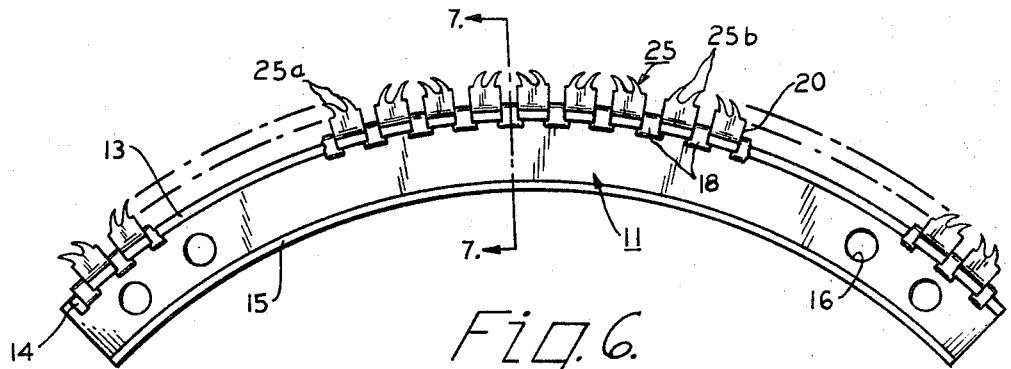
FIG. 6 is a side elevation similar to FIG. 1 and illustrates a form of cutting teeth designed for a relatively medium abrading action.
Figure 7:
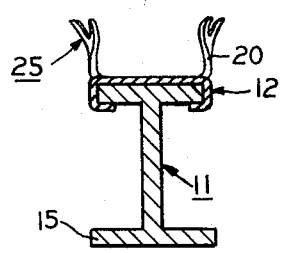
FIG. 7 is a section of FIG. 6 on the line 7—7.

FIGS. 6 and 7 illustrate a tooth design which can be used to provide a relatively medium-grained buff or used with medium size tires. The action of this tooth design is more severe than that of the embodiment of FIGS. 1 through 5. In this case, elevating sections 20 terminate in a pair of hook-shaped teeth generally indicated at 25. The teeth of adjacent elevating sections point in opposite directions and preferably are uniformly angled with respect to a longitudinal axis of the blade (FIG. 7). A blade of this construction, like the blade of FIGS. 1 through 5, offers additional advantages in that it is self-sharpening and reversible in use. For instance, referring to the blade of FIGS. 6 and 7 as an illustration and assuming an initial counterclockwise movement as viewed in FIG. 6, the teeth pointed in that direction, such as teeth 25$a$, perform the actual abrading action. Teeth pointed in the opposite direction, such as teeth 25$b$, perform little or no action at this time. However, the rubber contacted by the trailing edges of teeth 25$b$ (their cutting edges) has a dressing effect, such that the teeth 25$b$ actually undergo a honing operation. When teeth 25$a$ become worn, the rasp head is removed from its shaft or arbor, reversed, and then replaced on the arbor. The teeth 25$b$ now perform the abrading action, and teeth 25$a$ are dressed in the manner previously described for teeth 25$b$. In the case of the blade of FIGS. 1 through 5, it is the trailing tooth 22 which receives the honing action.

Figure 9:
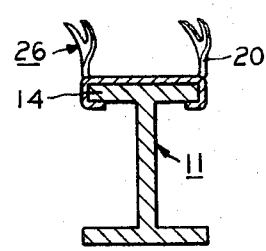
FIG. 9 is a section of FIG. 8 on the line 9—9.
Figure 8:
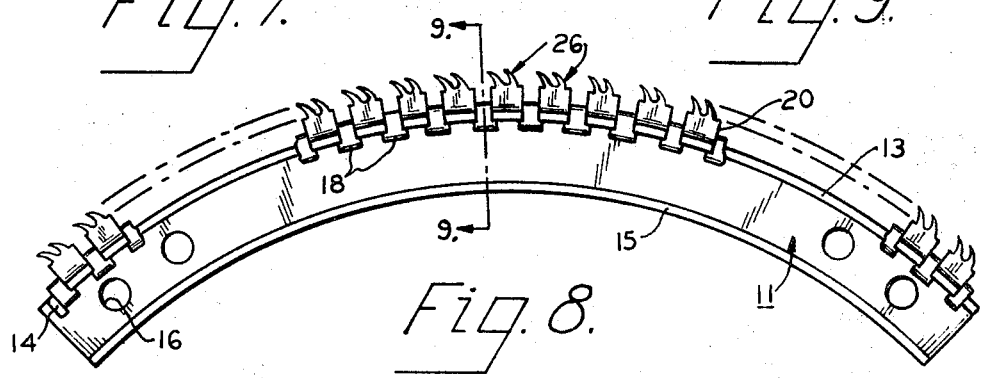
FIG. 8 is a side elevation similar to FIG. 1 and illustrates a form of cutting teeth designed for a relatively coarse abrading action.

FIGS. 8 and 9 illustrate a tooth design which can be used to provide a relatively coarse grain buff or used to meet heavy-duty requirements, such as buffing large truck or tractor tires. The construction of this dual-bladed unit is similar to that of FIGS. 6 and 7, except that all of hook-shaped teeth 26 point in the same direction; are parallel to each other; and are angled away from a longitudinal axis of the blade unit (FIG. 9).

Figure 10:
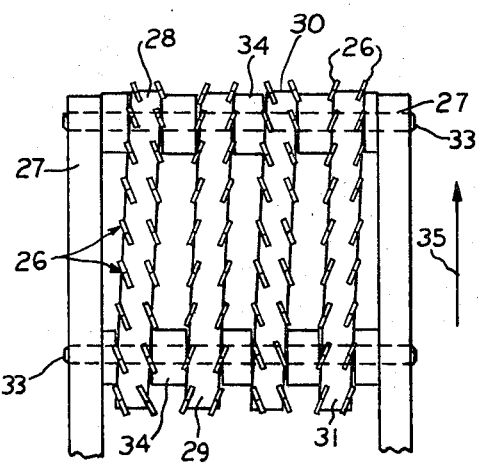
FIG. 10 is a plan view of a quadrant of a rasp head carrying four dual-blade units of the type illustrated by FIGS. 8 and 9.

FIG. 10 illustrates one manner in which any of the dual-bladed units may be mounted in a rasp head and further shows a technique of mounting units of the type illustrated by FIGS. 8 and 9 so as to achieve a reversible action with the same rasp head. More particularly, end plates 27 of a rasp head (of which FIG. 10 shows only one quadrant in plan) carry four double-bladed units 28, 29, 30, and 31 by means of pins 33 which pass through openings in sides 27 and the openings 16 in the mounting bars 11 and which are suitably held in locked position. The four units are parallel to each other and placed at an angle or rake with respect to the sides 27 as by bushings 34. The pins 33 also carry the bushings which separate the units from each other and from the sides 27 where needed. The bushings 34 can be rubber or metal.

In the embodiment of FIG. 10, the four units 28 through 31 are of the type illustrated by FIGS. 8 and 9. Units 28 and 30 have their teeth 26 pointed in an upward direction, as viewed in FIG. 10, while alternate, intervening units 29 and 31 have their teeth pointed in a downward direction. In operation, assuming initial movement in the direction of arrow 35, units 28 and 30 do the actual abrading operation, while units 29 and 31 do little or none. However, the teeth of units 29 and 31 may be honed or dressed in the described manner of the teeth of the rasp blade of FIGS. 6 and 7. When the teeth of units 28 and 30 become worn, the rasp head of which end plates 27 are a part is reversed on its drive shaft. Now the action is reversed. The units 29 and 31 provide the cutting action, and the teeth of units 28 and 30 are honed.

The blades of the present invention, whether used singly without a connecting bridge or as a dual-blade unit of U-shaped cross-section, operate at much lower temperatures than has been the case with prior tire rasps. For example, where operating temperatures of 140° F. where considered acceptable with prior blades, temperature readings taken of the present blades while in use have shown them to be under 100° F. and as low as 95° F. A contributing factor to the low temperature operation is the ready discharge of cuttings through the open areas between the elevating sections in the present rasp blades. Additionally, any tendency toward warping is readily resisted by the much stronger two-bladed units of U-shaped cross-section.

Both of these factors, low temperature operation and unit strength, increase the useful life of the blade as well as its effectiveness. As an example, prior blades buff up to about 15 tires before becoming dull and needing sharpening. The present blades buff as many as 60 tires before needing sharpening or reversal of the rasp head on its arbor. Blades of the present invention require 60 percent less steel in their fabrication, operate at lower temperatures, cut faster, and have at least 50 percent longer life than blades now available.

As indicated, the present rasp blades may be used, either as a single blade or as the described double-bladed unit. For example, the blades may be mounted in either manner in a rasp head as illustrated by U.S. Pat. 2,703,446 to Jensen.

Although the foregoing describes several embodiments of the present invention, it is understood that the invention may be practiced in still other forms within the scope of the following claims.

What is claimed is:

1. A rasp blade construction comprising in combination: a mounting member having mounting portions, and a warp-resistant, integral rasp blade of generally U-shaped cross-section having attaching means engaging said mounting portions for releasable attachment to said member, each leg of the U-shaped rasp blade terminating in cutting teeth.

2. The rasp blade construction of claim 1 wherein said mounting member is arcuately shaped in the direction of its length and said mounting portions are opposed flanges.

3. The rasp blade construction of claim 2 wherein said attaching means of the U-shaped, integral rasp blade are tab portions slidably engaging said opposed flanges.

4. The rasp blade construction of claim 1 wherein said attaching means slidably engages the mounting portions, and said mounting member has stop means adjacent one end to limit the movement of the U-shaped rasp blade in that direction.

5. The rasp blade construction of claim 1 wherein said mounting member has an I-shaped in cross-section, the width of a lower flange substantially equaling the width of an upper flange plus side-overlapping portions of said rasp blade, whereby like units of said rasp blade construction can be readily mounted side-by-side on a rasp head without interference.

6. The rasp blade construction of claim 1 wherein a leg of the U-shaped rasp blade comprises a plurality of elevating sections, each terminating in a tooth, the elevating sections of adjacent teeth being spaced apart lengthwise of the blade to define exits therebetween for cuttings and the like formed by the teeth during their use.

7. The rasp blade construction of claim 6 wherein said elevating sections terminate in a pair of diverging, pointed teeth separated by a depression of substantially parabolic curvature.

8. The rasp blade of claim 7 wherein the remote edges of said diverging teeth have a true circular curvature.

9. The rasp blade construction of claim 6 wherein said elevating sections terminate in a pair of hook-shaped teeth, all pointing in the same direction.

10. The rasp blade construction of claim 6 wherein said elevating sections terminate in a pair of hook-shaped teeth, the teeth of adjacent elevating sections pointing in opposite directions to provide a self-sharpening rasp blade construction also adapted for reversible use.

11. The rasp blade construction of claim 6 wherein the teeth of said U-shaped rasp blade are in staggered angle relation with respect to each other.

12. The rasp blade construction of claim 6 wherein the teeth of said U-shaped rasp blade are parallel to each other.

13. The rasp blade construction of claim 6 wherein the teeth of one leg of the U-shaped rasp blade diverge from the teeth of the other leg.

14. The rasp blade construction of claim 6 wherein an elevating section terminates in a pair of teeth and the longitudinal length of said elevating section is at least equal to the longitudinal distance extending between the opposed edges of the teeth it carries.

15. A rasp blade comprising an arcuately shaped section of generally U-shaped cross-section defined by a bight portion and connecting upstanding leg portions, said bight portion spacing apart said leg portions, and said leg portions comprising elevating sections terminating in at least one cutting tooth.

16. The rasp blade of claim 15 wherein said elevating sections are spaced along each leg portion, and said arcuately shaped section has mounting means between at least some of said spaced elevating sections adapted to mount the rasp blade.

17. The rasp blade of claim 15 wherein said elevating sections terminate in a pair of diverging pointed teeth separated by a depression of substantially parabolic curvature.

18. The rasp blade of claim 17 wherein the remote edges of said diverging teeth have a true circular curvature.

19. The rasp blade of claim 15 wherein said elevating sections terminate in a pair of hook-shaped teeth, all pointing in the same direction.

20. The rasp blade of claim 15 wherein said elevating sections terminate in a pair of hook-shaped teeth, the teeth of adjacent elevating sections pointing in opposite directions to provide a self-sharpening rasp blade construction also adapted for reversible use.

21. The rasp blade of claim 15 wherein an elevating section terminates in a pair of teeth and the longitudinal length of said elevating section is at least equal to the longitudinal distance extending between the opposed edges of the teeth it carries.

22. A rasp blade for removing rubber from the carcass of a tire and adapted for releasable attachment to a mounting member of a rasp head or the like, said blade being arcuately shaped in a longitudinal direction and generally U-shaped in cross-section, each leg of the U-shape comprising alternate upstanding elevating sections and downwardly turned tab portions adapted to make said releasable sliding attachment, the areas between the elevated sections left by the turned tab portions defining exits for cuttings and the like formed by the blade during use, and each elevating section terminating in a cutting element.

References Cited

UNITED STATES PATENTS

| | | | |
|---|---|---|---|
| 2,896,309 | 7/1959 | Jensen | 29—79 |
| 2,958,118 | 11/1960 | Neilsen | 29—78 |
| 3,082,506 | 3/1963 | Jensen | 29—79 |
| 3,102,325 | 9/1963 | Hemmeter | 29—79 |
| 3,351,997 | 11 1967 | Neilsen | 29—79 |

HARRISON L. HINSON, Primary Examiner

U.S. Cl. X.R.

144—208